Nov. 4, 1969 J. H. DAVIS 3,476,875

DIGITAL CLAMPING OF PULSE CODE MODULATED TELEVISION SIGNALS

Filed March 3, 1967 5 Sheets-Sheet 1

INVENTOR
J. H. DAVIS
BY John K. Mullarney
ATTORNEY

Nov. 4, 1969 J. H. DAVIS 3,476,875

DIGITAL CLAMPING OF PULSE CODE MODULATED TELEVISION SIGNALS

Filed March 3, 1967 5 Sheets-Sheet 5

United States Patent Office 3,476,875
Patented Nov. 4, 1969

3,476,875

DIGITAL CLAMPING OF PULSE CODE MODULATED TELEVISION SIGNALS

John H. Davis, Old Bridge, N.J., assignor to Bell Telephone Laboratories, Incorporated, Murray Hill and Berkeley Heights, N.J., a corporation of New York Filed Mar. 3, 1967, Ser. No. 620,390
Int. Cl. H04n 3/16
U.S. Cl. 178—7.1 7 Claims

ABSTRACT OF THE DISCLOSURE

A slow drift of the baseline of a television signal about its nominal amplitude typically tends to cause distortion of the signal and affect the signal-to-noise ratio. The present apparatus uses at least part of the digital information available at the output of the PCM encoder to reinsert by means of a digital feedback loop the appropriate amount of direct current signal to substantially compensate for the aforementioned drift. The scheme permits time-sharing of the digital feedback clamping equipment if several television signals are being multiplexed processed by a common encoder.

Background of the invention

This invention relates to the digital clamping of Pulse Code Modulated (PCM) television signals. The digital information is obtained from the existing PCM encoder, thus reducing circuit complexity. Further, the scheme permits time-sharing much of the clamping equipment if several television signals are being processed by a common encoder.

Television signals usually contain time-varying picture information. Since most television systems use Accoupling, the time-varying picture content causes a slow drift of the baseline of the signal about its nominal amplitude. Now unless the drift component is removed, any television transmission facility must handle the composite signal-video plus drift, without introducing a significant distortion. In the case of PCM transmission, this requires (1) clamping the television signal so that the drift seen by the PCM system is negligible, or (2) reducing the amplitude of the television signal so that the composite signal is usually within the clipping limits of the coder. The first of these solutions requires fairly complicated analog clamping circuits to be effective (see for example the article entitle "Clampers in Video Transmission" by Messrs. S. Doba, Jr. and J. W. Rieke, Transactions of the American Institute of Electrical Engineers, vol. 69, pt. 1, pages 477–487, 1950) and the second reduces the signal-to-quantizing noise ratio by the amount the signal amplitude must be reduced.

The present invention presents a radically different approach to the clamping problem. The scheme uses the digital information available at the coder output to reinsert the appropriate amount of DC current required to compensate for the slow drift. The signal-to-noise ratio improvement of this digital clamping technique asymptotically approaches the improvement of the typical analog clamper, while the equipment complexity is substantially decreased. Further, the scheme allows time-sharing of a substantial portion of the clamping equipment if several television signals are being processed by a common encoder. Analog clampers operate on a per channel basis, so that a substantial cost advantage can be achieved by using the present digital approach.

Summary of the invention

It is accordingly an object of the present invention to decrease the equipment complexity of clampers for television signals.

It is a further object of the invention to utilize digital clamping techniques for television signals in place of the prior art analog clampers.

Another object is to improve the signal-to-noise ratio in certain AC-coupled television signals when they are transmitted by pulse code modulation by restoring the DC signal component by means of digital processing.

A still further object of this invention is to permit time-sharing of much of the clamping equipment when several television signals are being processed by a common encoder.

The purpose of the present invention is to improve the picture quality and the signal-to-noise ratio in television signals when they are transmitted by pulse code modulation by substantially restoring the DC signal component by means of digital processing.

A slow drift of the baseline of a television signal about its nominal amplitude typically tends to cause distortion of the signal and affect the signal-to-noise ratio. Analog clamping techniques have been used heretofore to compensate for this drift. The apparatus of the instant invention uses the digital information available at the output of the PCM encoder to reinstate by means of a digital feedback loop the appropriate amount of direct current signal to compensate for the aforementioned drift. This digital clamping technique substantially reduces the circuit complexity of the noted analog clampers. In line with this, it is contemplated that only the first $k$-digits output of the encoder may be utilized for said compensation, the number of said $k$-digits being less than the typical $n$-digit output of encoder. In this manner the signal drift is still substantially corrected for but with a saving in circuit complexity. The scheme also allows time-sharing of the digital clamping equipment if several television signals are being processed by a common encoder.

Detailed description

Figure 1:
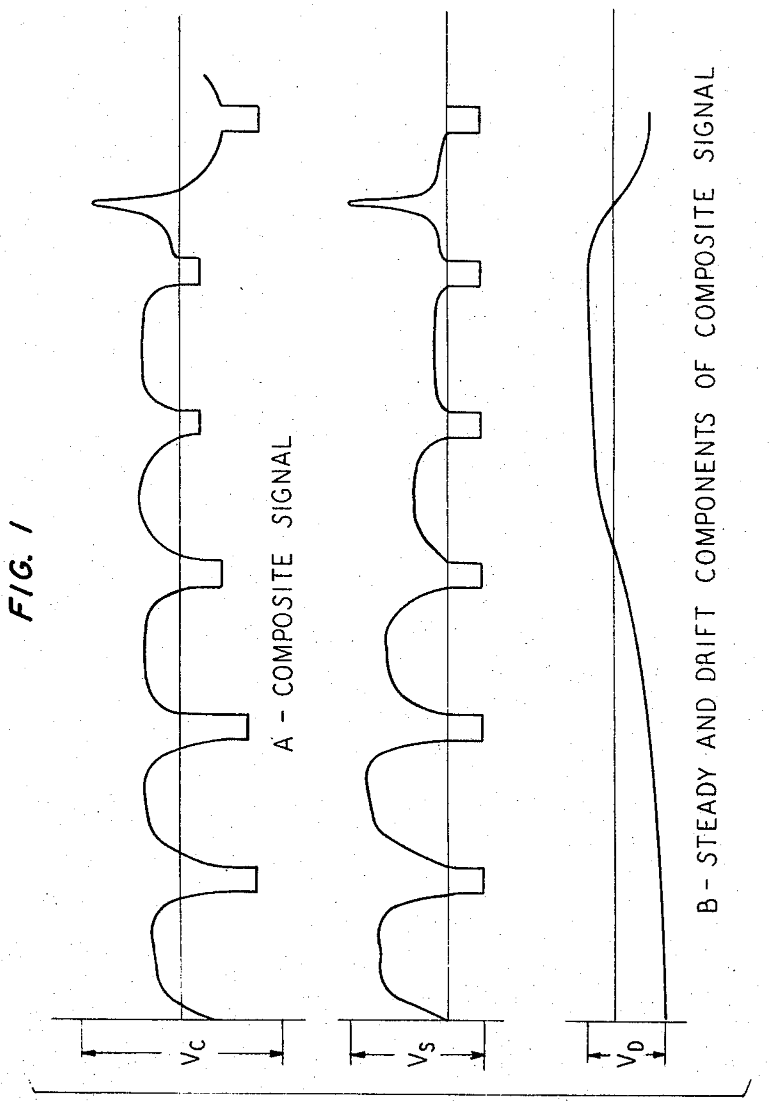
FIG. 1 shows a series of curves which represent the decomposition of a television signal into its video and drift components (exaggerated for clarity)

Turning now to the drawings, FIG. 1 shows the decomposition of a television signal into its video and drift components (exaggerated for clarity). For purposes of description, the horizontal sync pulses shown in FIG. 1 are of an elementary type, with no front or back porches. Let us now suppose that we have characterized the signal by specifying its peak-to-peak video amplitude $V_S$ and its peak-to-peak drift amplitude $V_D$. If this signal is transmitted over a PCM system, the coder must not clip amplitudes of less than $V_C=V_S+V_D$. It is clear from FIG. 1 that the drift can be eliminated by adding to the composite signal a voltage having the same amplitude as the drift, but the opposite polarity. If this operation can be performed there is no longer a drift component, and the amplitude of the signal into the PCM coder may be increased by the ratio $[(V_S+V_D)/V_S]$, giving an improvement.

$$I_A=20 \log_{10}\left[\frac{V_S+V_D}{V_S}\right]=20 \log_{10}(1+\rho)dB \quad (1)$$

where $\rho=V_D/V_S$.

Analog clamping works very much in this manner. However, knowledge of the drift amplitude can be obtained only during the horizontal sync pulse interval because the video portion of the signal is nondeterministic. The drift typically encountered is slow enough that the samples taken during the sync intervals adequately specify the drift time function, thus allowing all of the advantages of Equation 1 supra to be realized.

Figure 2:
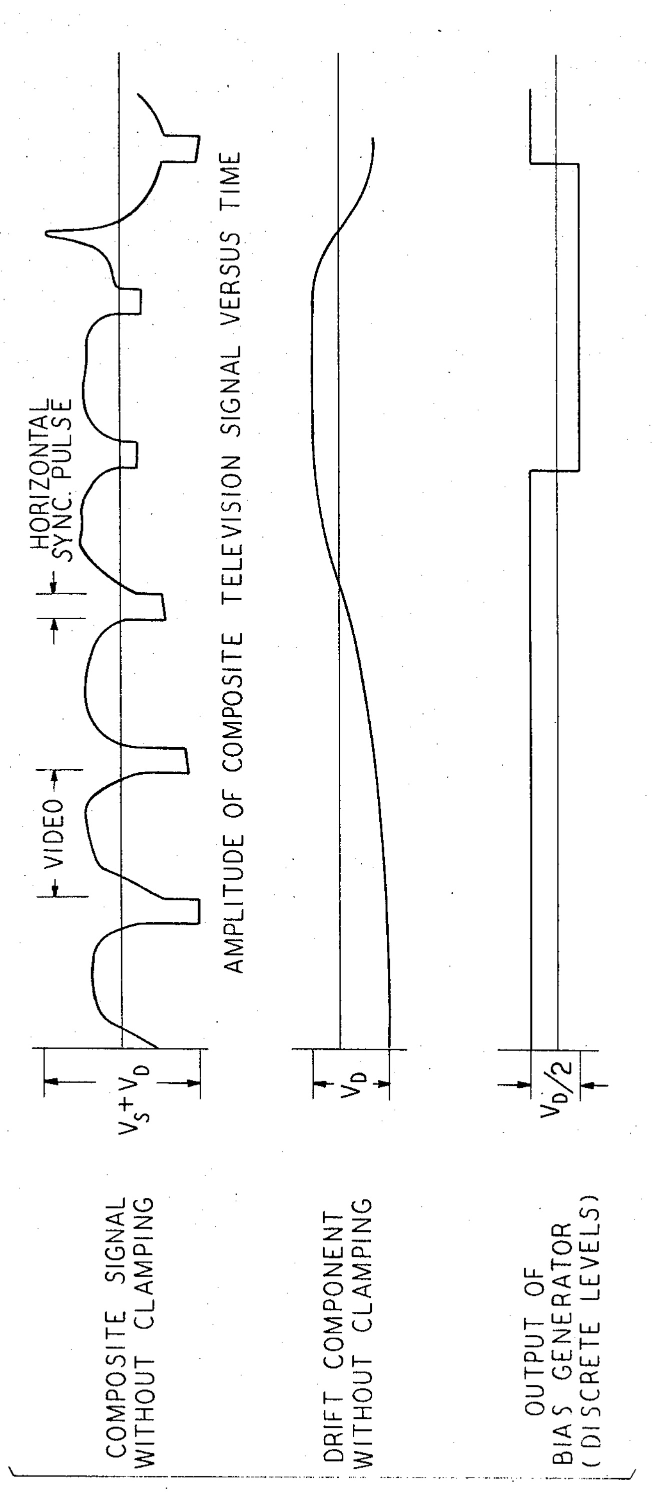
FIG. 2 shows a series of curves useful in explaining the principles of the present invention.

Next, suppose that we do not have a complete knowledge of the drift component during the horizontal sync interval as in the above case but instead we know only its polarity. FIG. 2 shows how we can use the polarity information to cut the effective drift amplitude in half. We simply detect any zero-crossing of the drift (during the sync interval) and add to the signal one of two discrete bias voltages of such polarity as to partially compensate for the drift. Since the effective maximum drift amplitude is now only $V_D/2$, the amplitude of the signal at the coder can be increased by the ratio $(V_S+V_D)/(V_S+\frac{1}{2}V_D)$, so the improvement is:

$$I_1=20 \log_{10}\left[\frac{V_S+V_D}{V_s+\frac{1}{2}V_D}\right]=20 \log_{10}\left[\frac{1+\rho}{1+\frac{1}{2}\rho}\right]dB \quad (2)$$

FIG. 2, which shows an exaggerated drift component, also shows a case where the drift changes rapidly in comparison to the sync frequency. Following such an event, the drift cannot be detected until the next sync time, so it can exceed $V_D/2$ occasionally. No clamper is able to follow the extreme change shown in FIG. 2, but such events occur with an extremely low probability.

The above reasoning may be extended to include a plurality of feedback bias levels. For example, if the drift component is detected in one of four discrete decision zones, one of four compensating biases will be added to the composite signal each time the drift falls within one of the zones. Here the effective peak-to-peak drift amplitude is $V_D/4$, and the improvement is:

$$I_2=20 \log_{10}\left[\frac{1+\rho}{1+\frac{1}{4}\rho}\right]dB \quad (3)$$

In general, the signal-to-noise improvement is given by $$I_k=20 \log_{10}\left[\frac{V_S+V_D}{V_S+V_D2^{-k}}\right]=20 \log_{10}\left[\frac{1+\rho}{1+\rho 2^{-k}}\right]dB \quad (4)$$

where $k=\log_2$ (number of decision zones).

The number of decision zones is determined by the number of $k$ bits delivered from the coder to the digital feedback loop. The larger $k$ is, the closer Equation 4 approaches Equation 1. However, the larger $k$ is, the greater the complexity of the equipment required. Nevertheless, to increase $k$ by one integer requires only the addition of a one bit storage cell, which is often economically attractive. It has been found that most of the improvement of analog clampers, can be achieved with a very few decision levels or zones.

Figure 3:
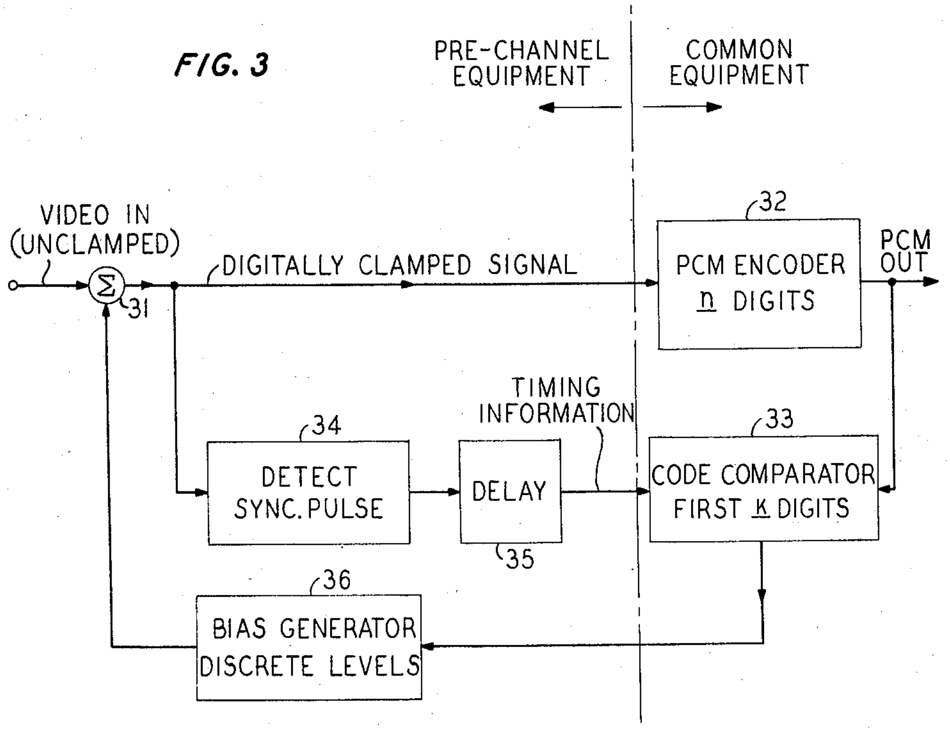
FIG. 3 is a schematic block diagram illustrating the basic concepts of digital clamping using the output of a PCM encoder.

FIG. 3 shows how a PCM coder can be used to extract the necessary information. Each sync pulse is coded into an $n$-bit word by the PCM coder. The particular code word that corresponds to zero drift (to an accuracy of one part in $2^n$) is known as a priori. If $2^k$ bias decision zones are required, the $k$-bit comparator simply looks at the first $k$ digits of the code words appearing during the sync interval ($k<n$) and decides if they are correct. If some drift has occurred, the code comparator adds in the proper amount of bias to compensate for the drift to within one part in $2^k$. This value of bias is held until the next concurrence of a PCM word and the horizontal sync pulse, as determined by the detect sync pulse circuit. The signal amplitude into the coder can thus be increased above the value it would be if unclamped, and the signal-to-noise ratio is improved according to Equation 4. It should be recognized that, with a more complicated sync pulse than that shown in FIG. 1, the timing information can be so arranged that the code word comparator only looks at those code words that correspond to the flat portion of the sync pulse.

The bias generator of FIG. 3 may or may not have memory. If no memory is used, the required amount of drift compensating bias is determined during each sync pulse interval by directly consulting the code words appearing out of the coder. If memory is used, it is possible to determine the proper bias by noting the difference between successive code words occurring during the sync pulse intervals. The first case (memoryless) is essentially straight PCM coding of the drift component and the second case is a differential-PCM approach. The choice of one of these approaches over the other will depend upon practical considerations such as the acceptable limit of distortion and the degree of circuit complexity that is desired.

FIG. 3 also shows the equipment that would be required on a per-channel basis if the PCM coder were shared among several video channels. Except for the sync pulse detector, the per channel equipment is quite simple and inexpensive. Accordingly, it should be obvious that digital clamping is economically more attractive than the somewhat higher performance analog clampers used on a per-channel basis.

Considering now FIG. 3 in greater detail, the composite video input signal, which is unclamped, is delivered to the summing circuit 31 and from there to the $n$-digit PCM encoder 32 and thence to the output. The PCM encoder may be of any type known in the art, the invention not being limited thereto. In this discussion, it is assumed that the PCM coder is of the word-organized type, with no companding being used. The output of the PCM encoder is also delivered to a code comparator 33.

The output of the summing circuit 31 is also coupled to the input of a sync pulse detector 34. The name of circuit 34 is descriptive of its function—namely, it detects the horizontal sync pulses that comprise part of the video signal. The sync pulse detector 34 will be described in detail hereinafter; briefly, it detects the timing of each horizontal sync pulse and in response thereto puts out a square wave pulse of predetermined duration for a purpose to be described. Prior to the application of the latter square wave pulse to the code comparator the pulse is delayed in delay 35 for a time equivalent to the delay in the PCM encoder 32.

The duration of the square wave pulse from detector 34 is determined by the number of PCM output code words that are to be delivered to the code comparator during a sync pulse period. If only the first $k$-digits of the $n$-digit code words are to be used in accordance with the invention, the code comparator stores only these first $k$-digits and ignores the remaining $n-k$. In general, the number of $k$-digits will be less than the typical $n$-digit output of the encoder, thus resulting in a saving in circuit complexity. However, it should be understood that for a very high degree of compensation $k$ can approach or equal $n$.

The code comparator can take several configurations; two of the same will be described hereinafter. The output of the code comparator 33 is delivered to the bias generator 36. As indicated hereinbefore this bias generator can also be of two types, that is, it may include a memory or be memoryless. In response to the output from the code comparator, the bias generator will generate an appropriate bias signal and apply the same to the summing circuit 31 where it will tend to compensate for the drift of the television signal. The output of the bias generator is generally in discrete levels, (although it may include filtering to give a smoother transition), each level being held for a period of at least the duration between adjacent outputs from the code word comparator. FIG. 3 represents the general concept of the principles of the present invention which are applicable to single signal transmission or to multiplex television signal transmission.

Figure 4:
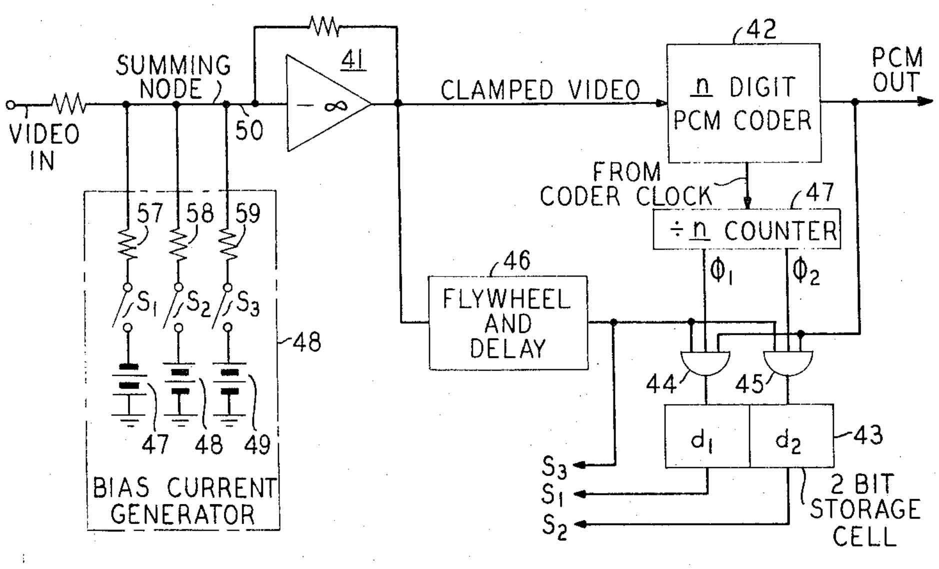
FIG. 4 is a schematic block diagram showing a simple two digit digital clamping arrangement.

In FIG. 4 there is shown a simplified digital feedback scheme in accordance with the invention wherein the number of decision levels or zones is equal to four; that is, $k$ is equal to two. The composite video input signal, which is unclamped, is delivered to the shunt feedback amplifier 41 and from there to the $n$-digit PCM encoder 42 and thence to the output. Here again the PCM encoder may be of any type known in the art and the invention is not limited thereto. The output of the PCM encoder is also delivered to the 2-bit storage cell 43 via the AND gates 44 and 45.

The output of the shunt feedback amplifier is also coupled to the flywheel and delay circuit 46. This circuit is the equivalent of the detect sync pulse circuit 34 of FIG. 3. Flywheel and delay circuit 46 may comprise, first, a tuned circuit resonating at the horizontal sync frequency, and a free-running blocking oscillator having a period substantially the same as the horizontal sync pulse period. However, synchronism between the period of the blocking oscillator and the horizontal sync pulse period is maintained by continuously feeding the sync pulses to the tuned circuit to assure synchronism. Here again, the output pulse is delayed for a period equivalent to the delay in the PCM encoder 42. During a horizontal sync pulse period one input to the AND gates 44 and 45 will be energized by the delayed output pulse from 46 for the duration of the sync interval. The first two significant bits $k$ of the PCM encoder will be gated to the 2-bit storage cell 43 under control of the $\div n$ counter 47 through connections $\phi_1$ and $\phi_2$. Thus these 2-bits and only these 2-bits are delivered to the storage cell 43 via AND gates 44 and 45.

The storage cell 43, which may be a shift register or any equivalent circuitry known in the art, momentarily stores the aforementioned 2-bits. The storage cell 43 is possibly of the destructive readin type wherein each readin destroys the information previously stored therein. Alternatively, an additional pulse may be obtained from the $\div n$ circuit and applied to the stages of the storage cell 43 to reset the same prior to a new readin of the $k$-bits.

After each readin to the shift register, the $S_1$ and $S_2$ signals are applied to the bias generator 48. In addition, a signal $S_3$ is applied for duration of the sync pulse interval. This bias generator is similar to the bias generator 36 of FIG. 3 and is symbolically illustrated in the drawing. The batteries 47, 48, and 49 and the high resistances 57, 58 and 59 appear as current sources to the summing node 50. Depending upon the information stored in the 2-bit register, one of the two relay contacts $S_1$ or $S_2$ will be closed, thereby applying the appropriate compensating current to the summing node. The current source comprising battery 49 and resistance 59 is used to set the nominal baseline of the sync pulse at the midrange of the PCM coder 42. This will occur under control of contact $S_3$ only when the sync pulse is present. The bias current generator 48 is symbolic in nature and it should be understood that instead of relay contacts electronic logic circuitry would be used to complete the appropriate circuit connections to the summing node. While $k$ is assumed to equal two in this case and hence a 2-bit register is all that is required, it will be appreciataed that $k$ can be any number up to $n$.

Figure 5:
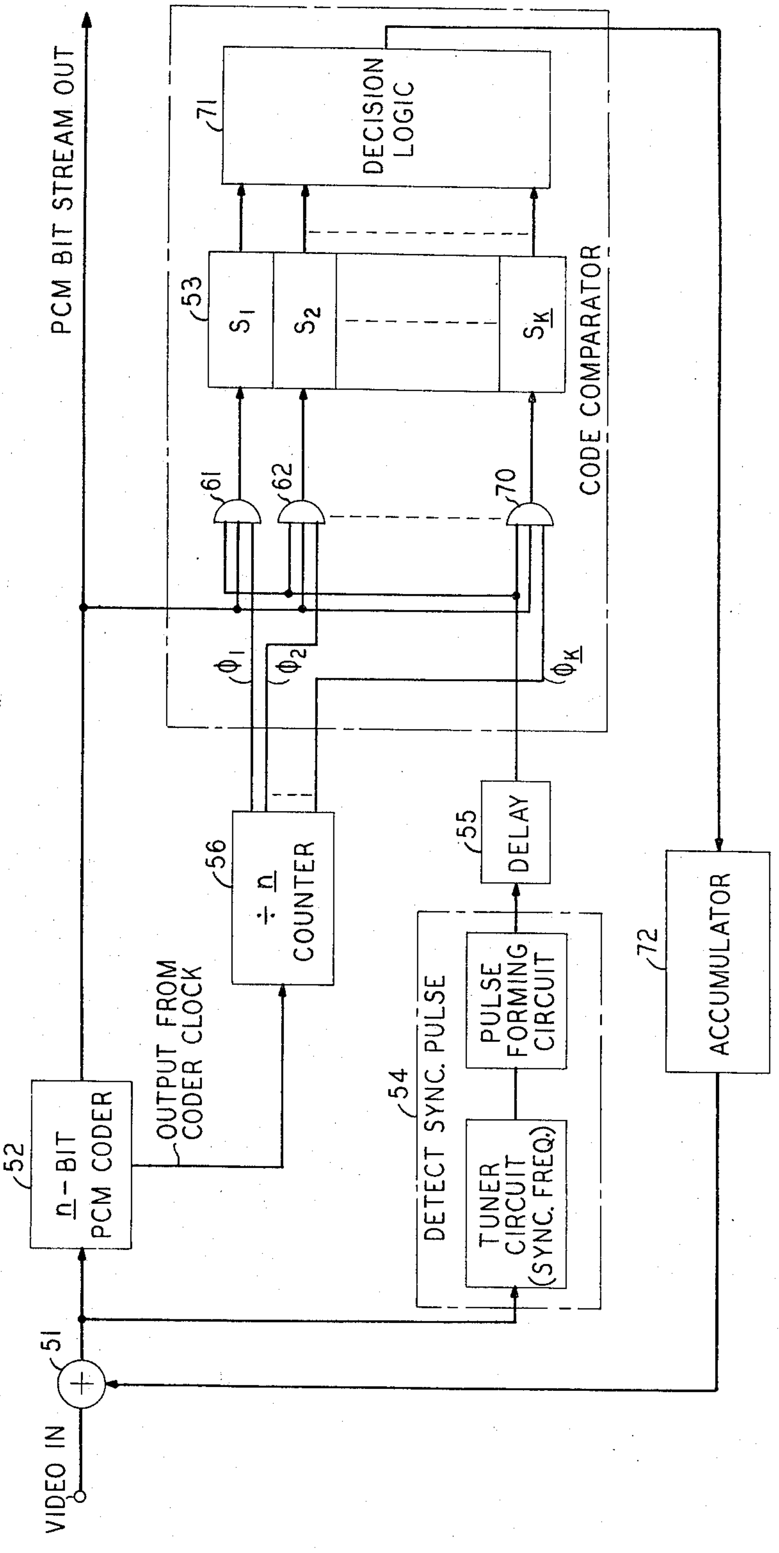
FIG. 5 is a schematic block diagram of digital clamping using differential feedback.

The embodiment shown in FIG. 5 is somewhat similar to the embodiment of FIG. 4 except that the same includes a memory (accumulator) and is a differential-PCM approach to the principles of the present invention.

Here again, the unclamped composite video input signal is delivered to a summing circuit 51 and from there to the $n$-bit PCM encoder 52 and thence to the output. The output of the PCM encoder is also delivered to the comparator or storage device 53.

The output of the summing circuit 51 is also connected to the sync pulse detector circuit 54 which can be similar to the circuit 46 of FIG. 4 or any other equivalent circuitry known to those in the art. Delay 55 again is equivalent to the delay in the PCM encoder 52.

In this embodiment an output from the $n$-bit PCM encoder 52 is also delivered to the $\div n$ counter 56 which in response thereto develops the short duration pulses $\Phi_1$, $\Phi_2$ . . . $\Phi_n$. These $\Phi$ pulses are synchronous with the $n$-bit pulse output of the coder 52. The code comparator or storage device 53 is somewhat similar to that disclosed in FIG. 4. The comparator comprises a number of storage stages equal to the number of $k$-bits to be used by the digital feedback loop. Each of the input AND gates 61, 62 . . . 70 has delivered thereto an input from the delay 55, the output of the coder 52, and the respective indicated outputs from the counter 56. Accordingly, each gate is energized only for a 1-bit interval and the ones and zeros from the encoder 52 will be read into their respective storage stages. As indicated, the number of these stages can be equal to $n$ or some predetermined number of $k$-bits less than $n$. In general, as indicated hereinbefore, $k$ will be less than $n$ and hence the storage stages will comprise something less than the number of $n$-bits from the coder.

The output from the storage device 53 is applied to the logical decision circuit 71. The decision circuit 71, which comprises simple AND and OR gates, decides if the code word stored in the storage device 53 is the word corresponding to zero drift. If the decision is in the negative the circuit 71 puts out a pulse to the accumulator 72 that is of the correct polarity to force the input to the coder 52 toward zero drift. This process is continued for successively appearing words during the sync interval until the decision circuit 71 recognizes the code word corresponding to zero drift. At that time the polarity of the pulse applied to accumulator 72 is reversed. Thus, with no drift present, successive inputs to the accumulator alternate in polarity. The accumulator 72 can be similar to accumulator devices found in state of the art differential PCM systems. Briefly, it may comprise a logical summing circuit whose output comprises the sum of all previous inputs. The output of the accumulator is then delivered to the summing circuit 51 where it compensates for the drift of the video signal.

If the number of $k$-bits is large it may be desirable to provide two storage devices 53 with alternate readin thereto; that is, the $k$-bits would be read into one storage device while readout occurs from the other during a given $n$-bit word. During the next word readin would be to the other storage device while readout takes place from the first storage device. In this manner the readin and readout operations are staggered. Such arrangements are well known in the art. For example, see the patent to R. C. Stiefel and H. W. Townsend No. 3,263,030, issued July 26, 1966. In this patent the readin to one storage device takes place during the time that readout from the other occurs and vice versa.

Figure 6:
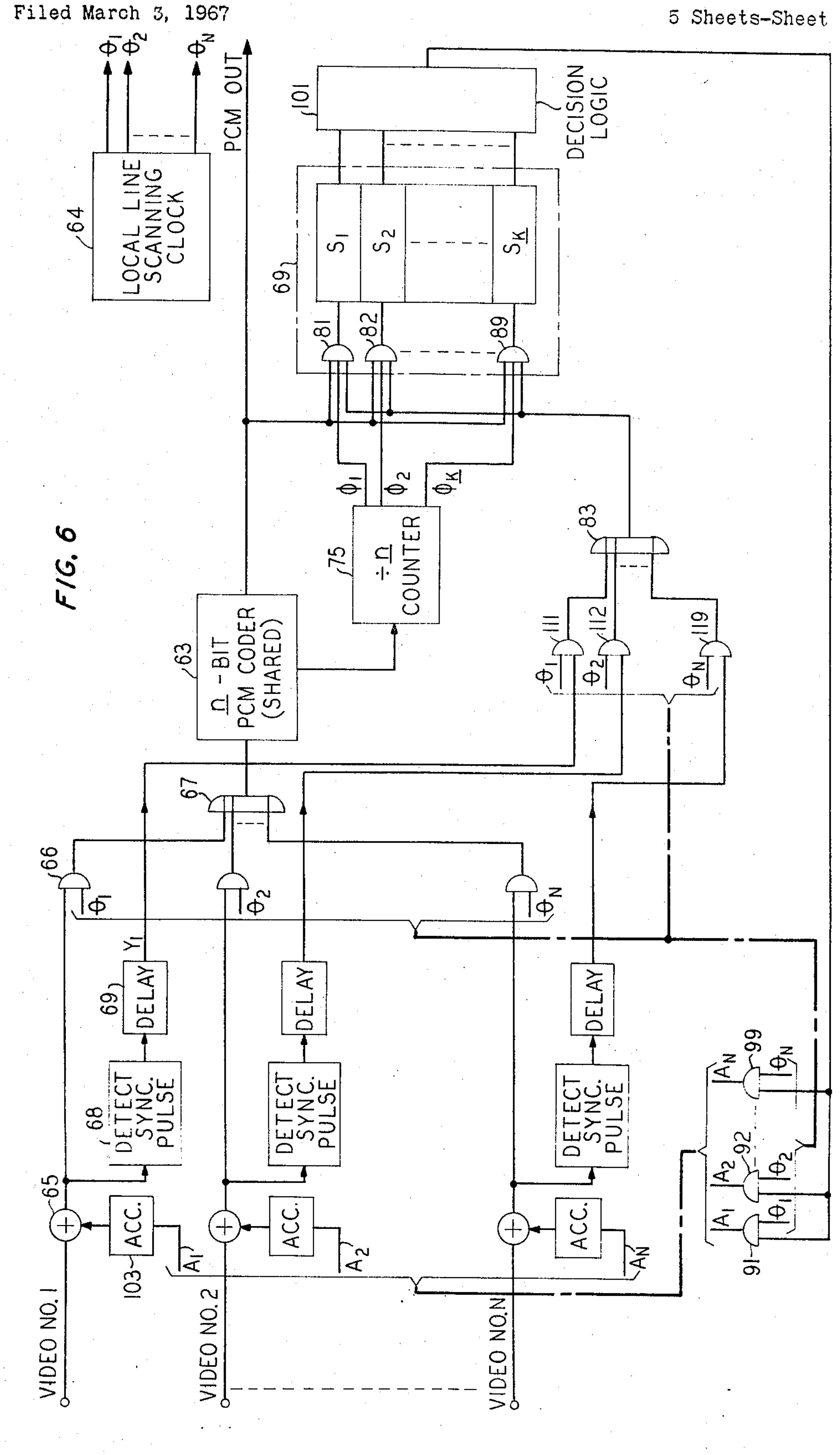
FIG. 6 is a schematic block diagram of an arrangement wherein several television signals are processed by a common encoder.

As indicated hereinbefore, the principles of the present invention permit time sharing of much of the clamping equipment when several television signals are being processed by a common encoder. Such an arrangement is illustrated in FIG. 6 wherein the unclamped video signals #1, #2 . . . #N are delivered to the shared $n$-bit PCM encoder 63. The several composite video signals are delivered sequentially and cyclically to the coder 63 under the control of a local timing clock 64 which provides the enabling signals $\Theta$, $\Theta_2 \ldots \Theta_n$. The clock 64 may typically be embodied in the coder 63. Since the treatment of each of these composite video signals is similar, treatment of the operation on video signal #1 will only be considered in detail. It should be understood that the treatment of the other video signals is similar and takes place in sequence.

The composite video input signal #1, which is unclamped, is delivered to the summing circuit 65 and from there to the AND gate 66 which is periodically and cyclically enabled by the clock signal $\Theta_1$. The output of the AND gate is then delivered to the $n$-bit PCM encoder 63 via the OR gate 67 and thence to the PCM output. The output of the PCM encoder is also delivered to a code comparator or storage circuit 68.

The output of the summing circuit 65 is also coupled to the input of a sync pulse detector 68 which is similar to the sync pulse detectors heretofore described. Delay 69 here again is equivalent to the delay in the PCM encoder 63, the output therefrom being designated $\gamma_1$.

The output of the $n$-bit PCM encoder 63 is also delivered to the $\div n$-counter 75 which, in response thereto, develops the short duration pulses $\varphi_1, \varphi_2 \ldots \varphi_k$. These $\varphi$-pulses are synchronous with the $n$-bit pulse output of the coder 63.

The gate comparator or storage device 69 is similar to that disclosed in FIG. 5. The comparator comprises a number of storage stages equal to the number of $k$-bits to be used by the digital feedback loop. Each of the input AND gates 81, 82, and 89 has delivered thereto an input from the OR gate 83, the output of the coder 63 and the respective indicated outputs of the $\div n$-counter 75. Accordingly, each gate is energized only for a 1-bit interval and the ones and zeros from the encoder will be read into their respective storage stages. As indicated hereinbefore, the number of these stages can be equal to $n$ or some predetermined number of $k$-bits less than $n$. In general, however, $k$ will be less than $n$ and hence the storage stages will comprise something less than the number of $n$-bits from the coder. This, of course, considerably reduces circuit detail and complexity. The output from the storage device 69 is then applied to the logical decision circuit 101. The logical decision circuit 101 is similar to that disclosed in FIG. 5. The output from the decision circuit 101 is applied to AND gates 91, 92 . . . and 99. However, since only AND gate 91 is enabled during the $\Theta_1$ interval, only a signal will appear at the output of AND gate 91. The output of this AND gate is then applied to the accumulator 103. Here again this accumulator may be similar to the accumulator 72 of FIG. 5 and can be similar to various accumulator devices to be found in known differential PCM systems. The output of the accumulator is then delivered to the summing circuit 65 where it compensates for the drift of the video signal.

The input to the OR gate 83 is derived from the AND gates 111, 112 . . . 119. Each of these AND gates is energized during and only during the period in which the input video signal is being sampled. For example, one of the inputs to AND gate 111 is the timing signal $\Theta_1$. Hence this gate will only be energized during the $\Theta_1$ interval. As described hereinbefore, the square wave output of the pulse sync detector 68 will determine the number of $k$-bit words delivered to the storage device 69. To this end, the other input to AND gate 111 is the signal $\gamma_1$. Hence, gate 111 will only be partially energized during the period that video signal #1 is being sampled and it will further be fully energized only for the period $\gamma_1$ during the horizontal which sync pulse is present at the summing circuit 65.

It should be evident from the drawing that the above described operation is similar for all of the other unclamped input video signals. Each video signal is encoded and compensated for sequentially and cyclically in the described manner.

As in the case with FIG. 5, if the number of $k$-bits is large, it may be desirable to provide two storage devices with alternate readin and readout operations. Such an arrangement is old in the art and hence will not be described in detail herein. Reference in this regard may be had to the aforementioned R. C. Stiefel and H. W. Townsend patent.

It should be understood that the above described embodiments are merely illustrative of the applications of the principles of the present invention. Accordingly, it will be clear that numerous other embodiments and modifications may be devised by those skilled in the art without departing from the spirit and scope of the invention.

What is claimed is:

1. In a system for pulse code modulating one or more television signals wherein a slow drift of the baseline of the same about a nominal amplitude is typically experienced, means for coupling the television signals to an $n$-digit pulse code modulation encoder, comparator means for momentarily storing during the horizontal sync pulse periods $k$-digits of the output of the encoder, means responsive to said comparator means to generate discrete direct current compensating signals, said compensating signals being generated continuously until the next related adjacent television horizontal sync pulse period, and means for subtractively adding the later signals to the incoming television signals to compensate for said drift.

2. A system as defined in claim 1 wherein $k$ corresponds to a predetermined number of the first $n$-digits from the encoder.

3. A system as defined in claim 2 wherein the $k$-digits are substantially less than the $n$-digits from the encoder.

4. A system as defined in claim 1 wherein the means responsive to said comparator means comprises accumulator means whose output comprises the sum of all the previous inputs to the same.

5. A system as defined in claim 1 wherein the improvement in the signal-to-noise ratio is defined by the equation $$I_k = 20 \log_{10}\left[\frac{1+\rho}{1+\rho 2^{-k}}\right] dB$$

where $\rho$ equals the drift voltage divided by the signal voltage less drift, and $k$ equals the number of digits stored in said comparator means.

6. In a system for pulse code modulating the television signals from a single source wherein a slow drift of the baseline of the signals about a nominal amplitude is typically experienced, means for coupling the television signals to an $n$-digit pulse code modulation encoder, means for temporarily storing during each horizontal sync pulse period a predetermined number of the first several digits of the output of said encoder, accumulator means responsive to said stored digits, the output of said accumulator means comprising the sum of all the previous inputs thereto, and means for subtractively adding the output of the accumulator means to the incoming television signals to compensate for said drift.

7. In a system for pulse code modulating the television signals from a plurality of sources wherein a slow drift of the baseline of the signals about their nominal amplitudes is experienced, means for scanning the television signals from said sources sequentially and cyclically and for coupling samples thereof to a common pulse code modulation encoder, means for momentarily storing during each scanned horizontal sync pulse period a predetermined number of the first several digits of the output of the encoder, a plurality of accumulator means each associated with the television signals of a given source, the output of each accumulator means comprising the sum of all the previous inputs thereto, means for coupling each of the predetermined number of digits to the appropriate accumulator means, and means for subtractively adding the output of each accumulator means to the associated television signals to compensate for said drift.

References Cited

UNITED STATES PATENTS

| | | | |
|---|---|---|---|
| 2,611,029 | 9/1952 | Bailey | 178—7.5 |
| 2,785,222 | 3/1957 | White | 178—7.1 |
| 3,281,530 | 10/1966 | Sennhenn | 178—7.1 |
| 3,315,033 | 4/1967 | Sennhenn | 178—7.1 |
| 3,396,236 | 8/1968 | Foster | 178—7.1 |

RICHARD MURRAY, Primary Examiner
JOHN MARTIN, Assistant Examiner

U.S. Cl. X.R.

325—42; 328—162